United States Patent [19]
Jobst

[11] 3,927,607
[45] Dec. 23, 1975

[54] DEFROSTER OUTLET
[75] Inventor: Wolfgang Jobst, Sudring, Germany
[73] Assignee: General Motors Corporation, Detroit, Mich.
[22] Filed: May 17, 1974
[21] Appl. No.: 470,831

[30] Foreign Application Priority Data
Aug. 11, 1973 Germany............................ 2340749

[52] U.S. Cl................................... 98/2.09; 98/2.19
[51] Int. Cl.²........................................... B60H 1/00
[58] Field of Search ........... 98/2.04, 2.08, 2.09, 2.1, 98/2.19

[56] References Cited
UNITED STATES PATENTS
2,152,338   3/1939   Will ...................................... 98/2.08
2,829,581   4/1958   Rumer ................................. 98/2.09

Primary Examiner—John J. Camby
Assistant Examiner—Henry C. Yuen
Attorney, Agent, or Firm—K. H. MacLean, Jr.

[57] ABSTRACT

A defroster outlet of elongated configuration having closely spaced, parallel side walls and with groove means adapted to be engaged by the downturned edge of the defroster opening in the instrument panel to prevent the distortion of the side walls by heat so as to maintain a constant cross-sectional flow area.

2 Claims, 7 Drawing Figures

DEFROSTER OUTLET

The invention relates to an air outlet nozzle provided in the instrument panel or the like, of a motor vehicle, particularly the defroster nozzle for the windscreen, its exit side and being arranged approximately in the plane of the surface of the instrument panel and in the region of an aperture in same.

As a rule, such defroster nozzles consist of plastics material. The nozzles protrude with their outlet orifices through a cavity in the instrument panel and they have an exit cross section which is very long and very narrow. Because of this, and also on account of lack of space, it has been usual to secure the nozzle by means of screws, solely at the ends of a longish expanse of the instrument panel which at this point, for example, may be a sheet metal portion. The part protruding through the cavity in the instrument panel may therefore vary in cross section due to temperature influences. The two parallel side walls of prior outlets, which are relatively thin and unsupported over a certain length, move towards each other and narrow the cross section in such a way that the air stream is changed, with a consequent detrimental effect. Moreover, an effective closure with the aperture in the instrument panel can only be attained with difficulty. Right from the outset, this resulted in a poor appearance which deteriorated still more due to the change at the outflow end of the nozzle.

The present invention provides a remedy. It creates an outlet nozzle, particularly a defroster nozzle whose design and attachment to the instrument panel ensure that the exit cross section does not vary, even through lengthy and subjected to relatively high temperature influences. Furthermore, the invention provides a clean transition from the instrument panel to the nozzle and therefore results in a pleasing appearance which does not change.

In order to eliminate the aforementioned defects, the invention does not require the use of expensive materials, for example; nor is it necessary to employ correspondingly thick edges or stays in the exit cross section so as to achieve the requisite stiffness. These measures would be costly, would occupy more space and would impair the air distribution.

The invention therefore proposes that at the edge of the aperture in the instrument panel there should be provided means which fix the end of the air outlet nozzle transverse to the outflow direction. These means may be of diverse kinds. For example, they may consist of one or more hook-shaped bends, or of hook-shaped attachments or the like connected to the metal sheeting of the instrument panel.

A particularly advantageous embodiment is attained, however, when the means consist of a folded or flanged edge which runs approximately parallel with the wall of the nozzle. Advantageously, the folded or flanged edge insertably engages a groove which is located at a flange formed by the air outlet nozzle. The flanged edge may run continuously round the entire cavity. This is preferable since it ensures an excellent clean outlet appearance. Again, it may be found sufficient if the flanged edge is provided at certain sections only, and acts in cooperation with the nozzle. Among other things, however, the appearance suffers, and in fact this arrangement is probably only desirable, if at all, when a layer of padding or the like is provided on the metal sheeting of the instrument panel; that is, in the area of the defroster nozzles, also.

A further feature of the invention resides in the fact that the nozzle is produced, in a manner known per se, from two parts and the flange surrounding the exit opening is connected to form one piece with one of the parts. This imparts greater stability to the nozzle at the exit side end right from the outset.

The front face of the flange may be designed to be entirely level and flat, or alternatively the front face of one of the two longer sides may be provided with an eminence which runs along the flange and which, while rising flatly from outside, passes over into the groove in arcuate shape. By adopting this last-mentioned measure, the metal sheeting of the instrument panel lying on the front face of the flange must be provided with a corresponding bulge, with the result that its strength is increased.

The flanged or folded edge engages with a certain clearance in the groove of the nozzle flange. Attachment of the nozzle to the instrument panel is effected by means of screws and the sides of the flange are correspondingly shaped for receiving the fixing screws. For attachment purposes, however, the folded or flanged edge may also be provided with a barbed-hook extremity which engages in a cutback in the groove. A sealing paste or sealing cord or the like may be introduced into the groove for sealing off and/or jointing purposes.

An embodiment of the invention will be explained in further detail with the aid of the drawing in which.

Figure 1:
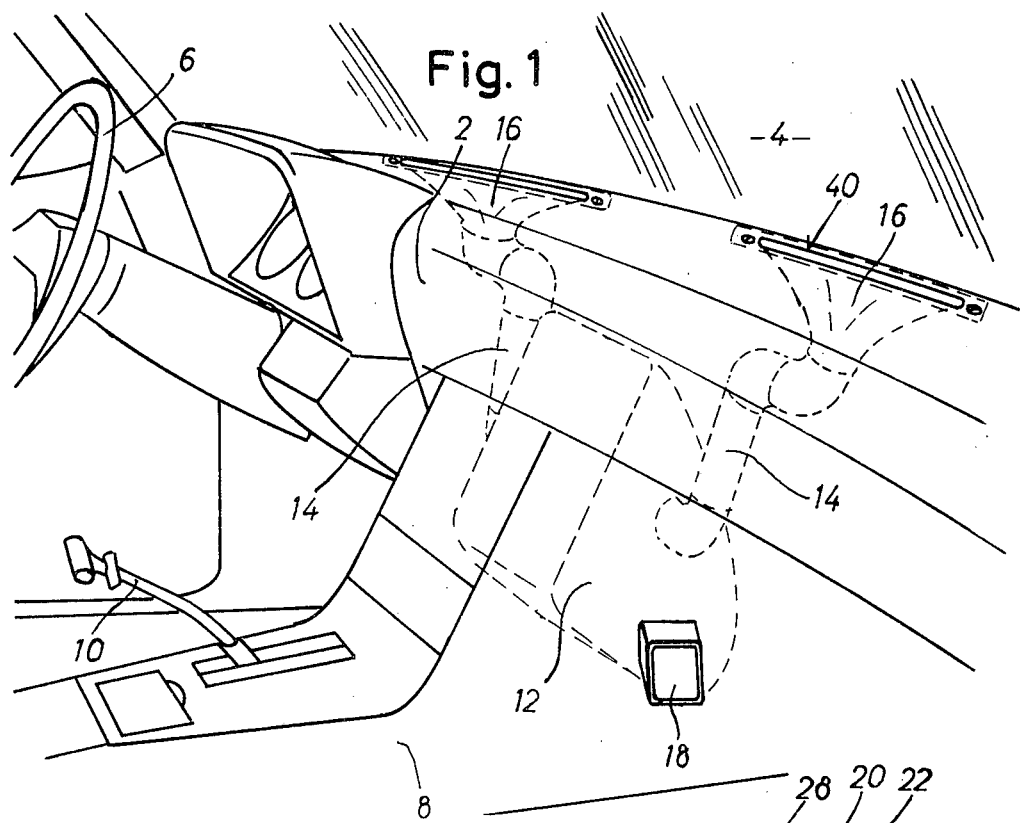
FIG. 1 shows the front part of the passenger compartment with instrument panel, steering wheel and the heating and ventilating device, in a schematic presentation.

In FIG. 1, the instrument panel is designated by 2, the windscreen by 4 and the steering wheel by 6. On the propeller shaft tunnel 8, a shift lever 10 for an automatic transmission is shown mounted on a console. Passing through slots, not shown, but sufficiently well known, in the bodywork sheeting in front of the windscreen, fresh air arrives at the air distributing plenum or chest 12 via conduits, likewise in a manner known per se. Depending upon the position of driver-operated flaps, the air — either unheated, or heated after traversing a heat exchanger — flows to the pipe lines 14 leading to the defroster nozzles 16, or else to the overflow openings 18 passing into the foot space.

Figure 5:
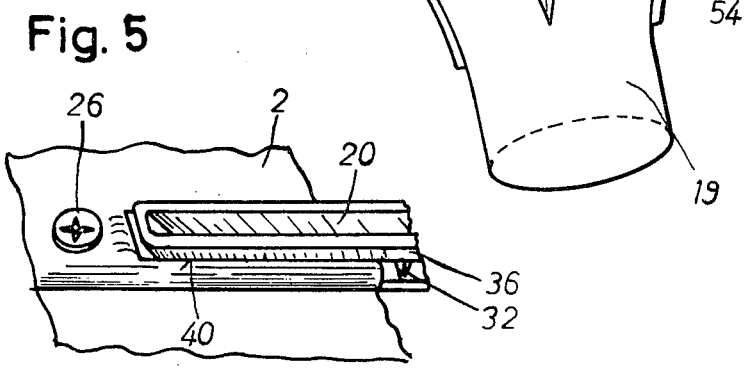
FIG. 5 is a fragmentary view of the exit opening of the defroster nozzle and a part of the metal sheeting of the instrument panel.
Figure 3:
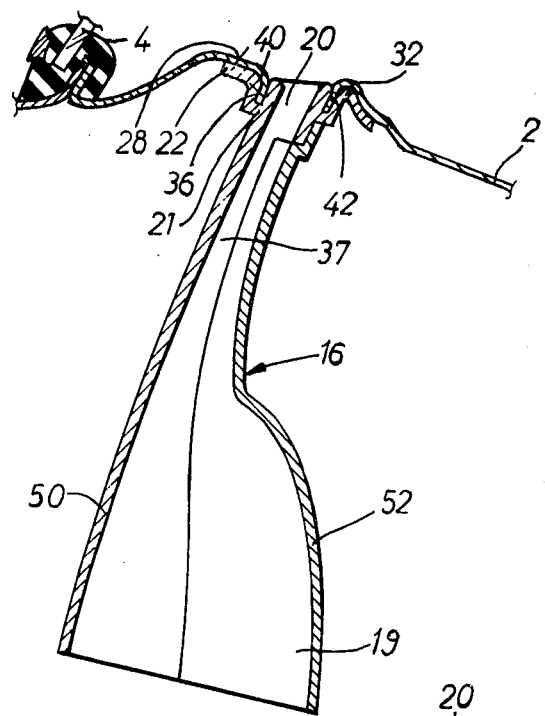
FIG. 3 shows a cross-sectional view through the defroster nozzle with a portion of the instrument panel.
Figure 4:
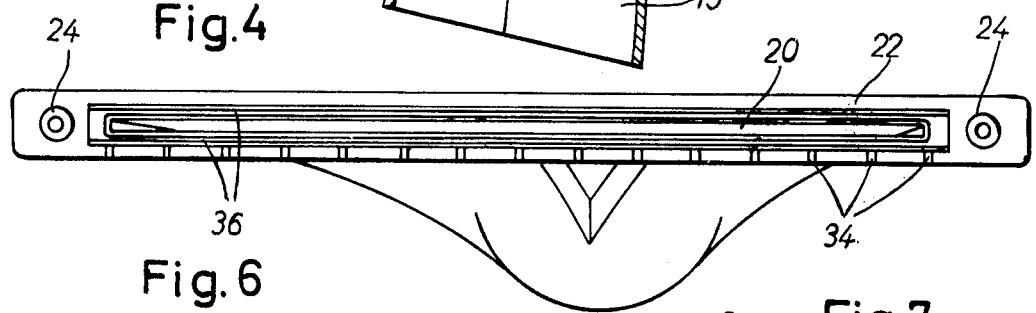
FIG. 4 is a planar view of the defroster nozzle.

The defroster nozzle 16 (FIG. 2) consists of the approximately circular pipe connection 19, but from there the through-flow cross section varies continuously up to a long and narrow outflow slit or exit opening 20 at the upper end 21. This outflow slit 20 is surrounded by a flange 22 which is provided with lateral apertures 24 for receiving attachment screws 26. One of these is visible in FIG. 5 showing the nozzle secured to the instrument panel. The front face of flange 22 is made flat at one side 28, whereas at the side 30 it is provided with an eminence or projection 32 which may be considered as extending over the entire length, since for the present purpose, several attachments or extensions 34 spaced from each other, attain the same effect as one continuous eminence.

A groove 36 running round the exit opening 20 and at a short distance from the latter, is arranged in flange 22. This groove is also clearly visible in cross section particularly in FIG. 3 and FIGS. 6 to 8. Due to this groove 36, side wall portions 38 are created between the latter and the flow passage 37.

Figure 6:
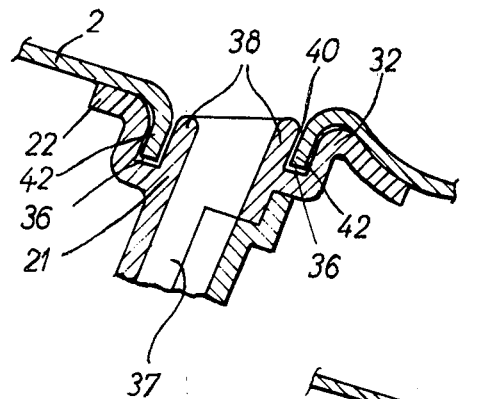
FIG. 6 is a cross-sectional view through the exit opening of the nozzle to an enlarged scale.
Figure 7:
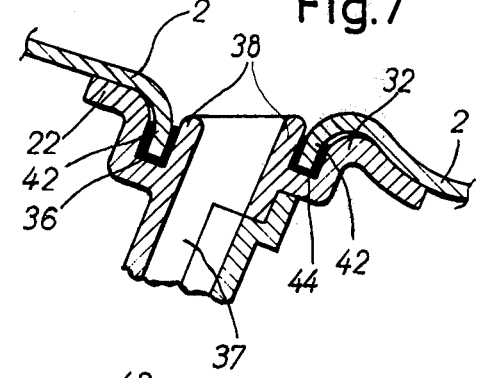
FIG. 7 shows the same cross-sectional view as in FIG. 6 but with a modified effective connection between the groove and the flanged edge of the instrument panel.

In order to give passage to the defroster nozzles, the metal sheeting of the instrument panel is provided with a cavity 40 whose rim is formed as a folded or flanged edge 42. This flanged edge 42 engages from above with clearance in the groove 36 on flange 22 of nozzle 16. In FIG. 6, this is visible in cross section. The upper end 21 is thereby fixed or secured transverse to the outflow direction, and in particular over the entire length, in such a way that a constriction of the cross section of the exit opening cannot take place. Thus, the wall portions 38 cannot move or incline inwards. Attachment of the nozzle 16 to the metal sheeting of the instrument panel is effected by means of screws. Appropriately, sheeting screws are used, these passing through the metal plate and recessing into the holes 24 in flange 22.

Figure 8:
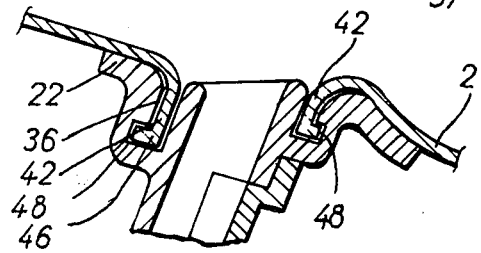

It may be advisable to introduce a sealing compound 44 or the like, into the groove 36 in order to obtain a seal or joint between the flange 22 and the folded or flanged edge 42. Moreover, it may be appropriate, by adopting the measures according to the invention, to bring about the mounting of the nozzle 16 at the instrument panel at the same time. This is illustrated in FIG. 8. With this object, the flanged edge 42 is provided with a hooked extension means 46 which snaps into a cutback 48 or recess in groove 36. During assembly the groove 36 expands appropriately until the extension 46 snaps into the cutback or recess 48.

Figure 2:
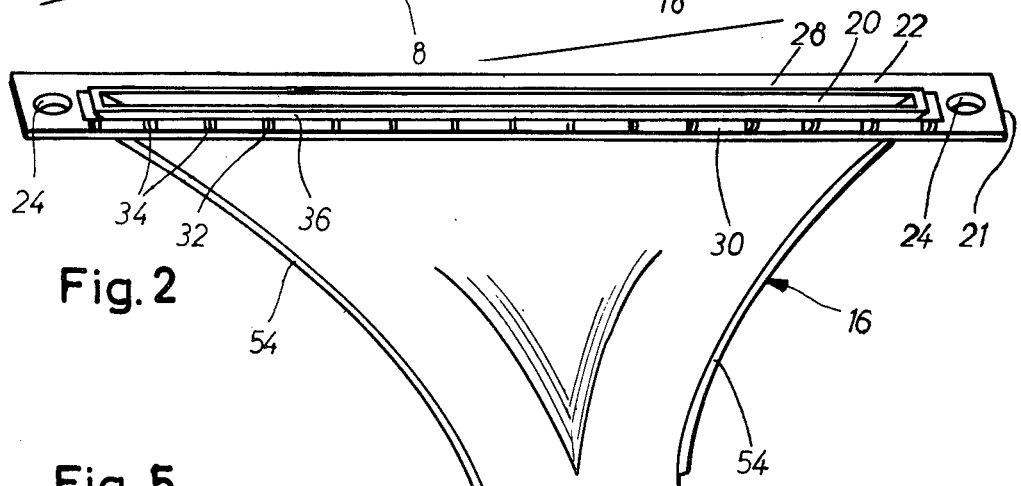
FIG. 2 shows a defroster nozzle in front elevation.

For the rest, the defroster nozzle consists of two parts 50, 52 (FIG. 3) which are joined to each other by adhesion, welding or the like. With this object, the parts have a narrow flange 54 (FIG. 2). At part 50, the flange 22 is, however, molded on in one piece, as will be seen in FIG. 3. As will be apparent from FIGS. 6 to 8, the ends of the wall portions 38 run oblique to the front face 28 of flange 22, in order that the air stream will not be directed immediately towards the interior of the vehicle.

Of course, the invention is not tied to the form of nozzle illustrated, or to its cross sectional shape. Thus, it is applicable even to other nozzle cross sections, even when the nozzle is not arranged at the instrument panel, or not directly there.

What is claimed is as follows:

1. A defroster outlet nozzle assembly to direct a flow of air through an instrument panel having an opening therethrough formed by a relatively rigid and depending edge portion; said nozzle having parallel, elongated side walls defining a constant flow area along its length for the passage of air to be discharged against a windshield; means adjacent said side walls and operably connected to said side walls for engaging the edge portion of the instrument panel and preventing movement of said side walls toward one another caused by heat distortion; said means including a flange portion generally extending in a direction transverse to the flow of air through said nozzle; elongated groove means formed in said flange and parallel to said side walls defining a cavity presenting an upward-facing opening adapted to operatively receive said depending edge portion of said instrument panel thereby providing lateral support for said side walls to prevent relative movement therebetween which may be caused by thermal stresses.

2. A defroster outlet nozzle assembly to direct a flow of air through an instrument panel having an opening therethrough formed by a depending edge portion; said nozzle having parallel, elongated side walls defining a constant flow area along its length for the passage of air to be discharged against a windshield; means adjacent said side walls and operably connected to said side walls for engaging the edge portion of the instrument panel and preventing the movement of said side walls toward one another caused by heat distortion; said means including a flange portion generally extending in a direction transverse to the flow of air through said nozzle; groove means formed in said flange defining a cavity presenting an upward-facing opening adapted to operably receive said depending edge portion of said instrument panel; said depending edge portion of said instrument panel having hook-like extensions offset from the plane of the edge portion; said flange portion having a recess formed adjacent the bottom of said groove presenting surfaces adapted to engage said hook-like extensions of said edge portion to attach said nozzle to said instrument panel.

* * * * *